(12) United States Patent
Wang et al.

(10) Patent No.: US 12,049,872 B2
(45) Date of Patent: Jul. 30, 2024

(54) COOLING DEVICE, MOTOR, AND WIND TURBINE SET

(71) Applicant: XINJIANG GOLDWIND SCIENCE & TECHNOLOGY CO., LTD., Xinjiang (CN)

(72) Inventors: Dinghui Wang, Beijing (CN); Jing Xia, Beijing (CN); Wenshou Fan, Beijing (CN)

(73) Assignee: GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 389 days.

(21) Appl. No.: 17/594,862

(22) PCT Filed: Mar. 9, 2020

(86) PCT No.: PCT/CN2020/078431
§ 371 (c)(1),
(2) Date: Nov. 1, 2021

(87) PCT Pub. No.: WO2020/220836
PCT Pub. Date: Nov. 5, 2020

(65) Prior Publication Data
US 2022/0213874 A1    Jul. 7, 2022

(30) Foreign Application Priority Data
Apr. 30, 2019   (CN) .......................... 201910364180.4

(51) Int. Cl.
*H02K 9/10*     (2006.01)
*F03D 80/60*    (2016.01)
(Continued)

(52) U.S. Cl.
CPC ............. *F03D 80/60* (2016.05); *F03D 80/80* (2016.05); *H02K 9/10* (2013.01); *H02K 9/18* (2013.01); *F05B 2260/20* (2013.01)

(58) Field of Classification Search
CPC .................................. H02K 9/10; H02K 9/18
(Continued)

(56) References Cited

U.S. PATENT DOCUMENTS 8,304,941 B2    11/2012  Mantere
2010/0102655 A1  4/2010  Eriksen et al.
(Continued)

FOREIGN PATENT DOCUMENTS

CN    102290922 A    12/2011
CN    109474113 A    3/2019
(Continued)

OTHER PUBLICATIONS

The First Australian Office Action dated Sep. 1, 2022; Appln. No. 2020266898.
(Continued)

*Primary Examiner* — Jose A Gonzalez Quinones
(74) *Attorney, Agent, or Firm* — Frank Gao, Esq.

(57) ABSTRACT

The present application relates to a cooling device, a motor, and a wind turbine set. The cooling device is integrated inside the motor and includes a housing extending along an axial direction of the motor, wherein the housing has a receiving cavity and an air inlet and an air outlet in communication with the receiving cavity, and the housing is in communication with an interior of the motor through the air inlet and in communication with the ventilation chambers at two axial ends of the motor through the air outlet; a heat exchanger located in the receiving cavity and provided close to the air outlet; and a circulation fan provided in the receiving cavity along the axial direction of the motor. The (Continued)

cooling device can realize a modular design of the cooling device, has a simple and compact structure, and occupies a small space.

11 Claims, 6 Drawing Sheets

(51) Int. Cl.
*F03D 80/80* (2016.01)
*H02K 9/18* (2006.01)
(58) Field of Classification Search
USPC .......................................... 310/64, 58, 60 R
See application file for complete search history.

(56) References Cited

U.S. PATENT DOCUMENTS

| | | | |
|---|---|---|---|
| 2010/0237727 A1* | 9/2010 | Mantere | H02K 9/10 310/64 |
| 2011/0181137 A1 | 7/2011 | Kori et al. | |
| 2012/0001505 A1 | 1/2012 | Henke et al. | |
| 2016/0233742 A1 | 8/2016 | Airoldi et al. | |
| 2017/0077786 A1 | 3/2017 | Chernogorski | |

FOREIGN PATENT DOCUMENTS

| | | | | |
|---|---|---|---|---|
| EP | 3641109 A1 | 4/2020 | | |
| JP | 2006246603 A | 9/2006 | | |
| WO | 2015/102388 A1 | 7/2015 | | |
| WO | 2018/141514 A1 | 8/2018 | | |
| WO | WO-2020143887 A1 * | 7/2020 | ............ | F03D 13/20 |

OTHER PUBLICATIONS

The Extended European Search Report dated May 12, 2022; Appln. No. 20798535.9.
The First Indian Office Action dated May 4, 2022; Appln. No. 202117052060.
The International Search Report mailed Jun. 10, 2020; PCT/CN2020/078431.
The First Chinese Office Action dated Oct. 23, 2023; Appln. No. 201910364180.4.
First European Office Action dated Jan. 25, 2023; Appln. No. 20798535.9.
Second European Office Action dated Jul. 20, 2023; Appln. No. 20798535.9.
EPO Summons to attend oral proceedings; dated Dec. 14, 2023; Appln. No. 20798535.9.

* cited by examiner

COOLING DEVICE, MOTOR, AND WIND TURBINE SET

CROSS-REFERENCE TO RELATED APPLICATION

The present application is a National Stage of International Application No. PCT/CN2020/078431, filed on Mar. 9, 2020, which claims priority to Chinese Patent Application No. 201910364180.4 entitled "COOLING DEVICE, MOTOR, AND WIND TURBINE SET" filed on Apr. 30, 2019, both of which are incorporated herein by reference in their entireties.

FIELD

The disclosure relates to a technical field of cooling, and in particular to a cooling device, a motor, and a wind turbine set.

BACKGROUND

Wind power is one of the renewable energy technologies which are the closest technologies to commercialization, and is the focus of renewable energy development. A motor in the wind turbine set has heat loss during operation, which mainly includes electromagnetic loss, that is, Joule heat generated in the winding due to ohmage, that is, copper loss; hysteresis loss, eddy current loss, or the like in an iron core, that is, iron loss; inevitable stray loss; and also magnetic steel loss if it is a permanent magnet motor. These losses cause the motor to release a large amount of heat when it is in operation, and the heat will not only cause a certain impact on the motor itself and its insulation structure, which leads to shortened insulation life and even failure insulation, but also cause the output power of the motor to drop continuously.

With the rapid development of offshore wind turbine set, the single set capacity of the set continues to increase, which directly leads to the continuous increase in the loss of the wind turbine set and leads to the cooling system of the motor to occupy larger space in the nacelle. For working conditions with heavy wind and sand or harsh working environment, especially for offshore salt spray environment, the air-air cooling system is likely to cause dust accumulation in the turbine and decrease in the cooling air volume of the system, which results in insufficient heat dissipation, and more likely to cause damage and failure of components, which reduces the life of the whole machine; and if a water cooling system is adopted, in order to ensure the winding temperature limit, requirement on temperature rise, and temperature uniformity, it is necessary to dispose too many circuits and joints in the motor, the compact flow channel also causes the increase of system resistance and self-consumption, and an air cooling system is also required independently considering the cooling of the ends of the winding and the rotor, thereby resulting in a complicated structure of the and reducing the reliability.

SUMMARY

The object of the present application is to provide a cooling device, a motor, and a wind turbine set, and the cooling device has a simple and compact overall structure and occupies a small space.

In an aspect, the present application proposes a cooling device, which is integrated inside the motor, and the cooling device includes a housing extending along an axial direction of the motor, wherein the housing has a receiving cavity and an air inlet and an air outlet in communication with the receiving cavity, and the housing is in communication with an interior of the motor through the air inlet and in communication with ventilation chambers at two axial ends of the motor through the air outlet; a heat exchanger located in the receiving cavity and provided close to the air outlet; and a circulation fan provided in the receiving cavity along the axial direction of the motor.

In another aspect, the present application further proposes a motor, the motor includes a stator support and a rotor support, which are connected in a dynamic sealed manner to form ventilation chambers at two axial ends of the motor, and the motor further includes a confluence chamber provided along a circumferential direction of the stator support; and at least one cooling device of any type as above described distributed at intervals along the circumferential direction of the stator support, wherein the cooling device is located on a radial inner side of the confluence chamber and in communication with the confluence chamber through the air inlet.

In another aspect, the present application also provides a wind turbine set, which includes a nacelle; any one motor as above described, wherein a circulation fan of a cooling device of the motor is provided on a side of the nacelle.

By providing the heat exchanger and the circulation fan in the housing extending along the axial direction of the motor, the cooling device provided by the present application can realize a modular design of the cooling device, has a simple and compact structure, and occupies a small space. By providing a confluence chamber and at least one cooling device along the circumferential direction of the stator support, the motor provided by the present application can cool the heating components inside the motor in circulation, has a simple and compact overall structure, so the heat dissipation is uniform. In addition, by adopting the motor, the wind turbine set provided by the present application can effectively reduce the size of the nacelle, therefore reducing the whole machine cost and load and improving the reliability and maintainability of the wind turbine set.

BRIEF DESCRIPTION OF THE DRAWINGS

The present application can be better understood from the following description of the specific embodiments of the present application in conjunction with the accompanying drawings, wherein by reading the following detailed description of the non-limiting embodiments with reference to the accompanying drawings, other features, objects, and advantages of the present application will become more apparent, and the same or similar reference numbers indicate the same or similar features.

DESCRIPTION OF REFERENCE NUMBERS

Figure 1:
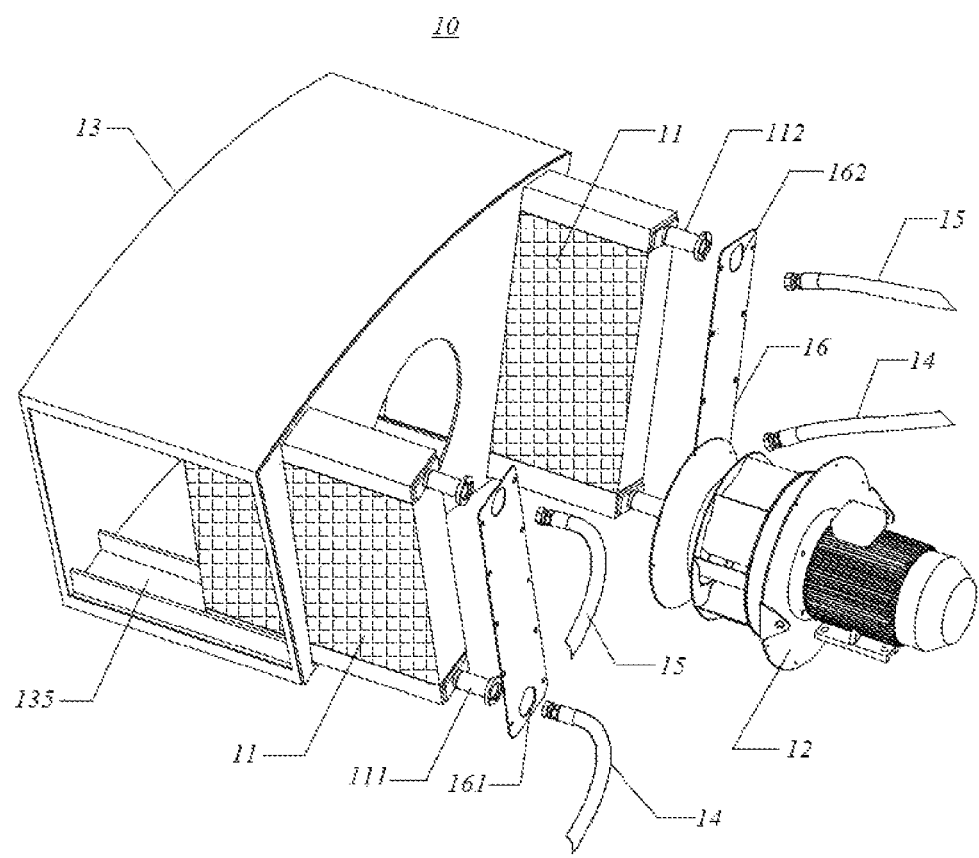
FIG. 1 is a schematic view of an exploded structure of a cooling device provided by an embodiment of the present application.

- 10—cooling device; 11—heat exchanger; 111—first joint; 112—second joint; 12—circulation fan; 13—housing; 130—receiving cavity; 1301—air inlet; 1302—air outlet; 131—first plate; 132—second plate; 133—third plate; 134—fourth plate; 135—installation groove; 136—inspection opening; 14—liquid supply pipe; 15—liquid/air return pipe; 16—cover plate; 161—first opening; 162—second opening;
- 1—main shaft; 1a—stator winding; 1b—stator core; 1c—air gap; 1d—radial channel;
- 20—stator support; a—ventilation hole; 21—annular plate; 22—separation plate; 23—ventilation pipe; 24—filter; 25—confluence chamber; 26—first end plate; 27—second end plate;
- 30—rotor support; 3a—magnetic steel; 31—ventilation chamber;
- 100—motor; 200—wheel hub; 210—impeller; 300—nacelle.

DETAILED DESCRIPTION

The features and exemplary embodiments of various aspects of the present application will be described in detail below. Many specific details are disclosed in the following detailed description in order to fully understand the present application. However, it is obvious to those skilled in the art that the present application can be implemented without some of these specific details. The following description of the embodiments is only to provide a better understanding of the present application by showing examples of the present application. The present application is by no means limited to any specific configurations and algorithms proposed below, but covers any modification, replacement, and improvement of elements, components, and algorithms without departing from the gist of the present application. In the drawings and the following description, well-known structures and technologies are not shown in order to avoid unnecessary obscurity of the present application.

In order to better understand the present application, a cooling device, a motor, and a wind turbine set provided by the embodiments of the present application will be described in detail below in conjunction with FIGS. 1 to 6.

With reference to FIG. 1, an embodiment of the present application provides a cooling device 10 integrated inside a motor and including a heat exchanger 11, a circulation fan 12, and a housing 13.

The housing 13 extends along an axial direction of the motor, has a receiving cavity 130 and an air inlet 1301 and an air outlet 1302 in communication with the receiving cavity 130, and is in communication with an interior of the motor through the air inlet 1301 and in communication with ventilation chambers located at two axial ends of the motor through the air outlet 1302.

The heat exchanger 11 is located in the receiving cavity 130 and provided close to the air outlet 1302, and the circulation fan 12 is provided in the receiving cavity 130 along the axial direction of the motor.

The heat exchanger 30 may be an air-air or air-liquid heat exchanger. Optionally, the heat exchanger 30 is, for example, but not limited to, a plate-fin, tube-fin, and tubular air-liquid heat exchanger, and the cooling medium in the heat exchanger 30 may be a liquid medium or a phase change medium, and exchanges heat with an external cooling system through a liquid supply pipe 14 and the liquid/air return pipe 15 located outside of the housing 13 to further cool the motor in circulation.

Under the action of the circulation fan 12, the cooling air enters the ventilation chambers at the two axial ends of the motor through the air outlet 1302, flows through a heating component inside the motor, and then enters the housing 13 through the air inlet 1301 to exchange heat with the heat exchanger 11.

By providing the heat exchanger 11 and the circulation fan 12 in the housing 13 extending along the axial direction of the motor, the cooling device 10 provided by the embodiments of the present application can realize a modular design of the cooling device 10, has a simple and compact structure, occupies a small space, and may be applied to various devices and apparatus, a motor or the like, that require heat dissipation.

Figure 2:
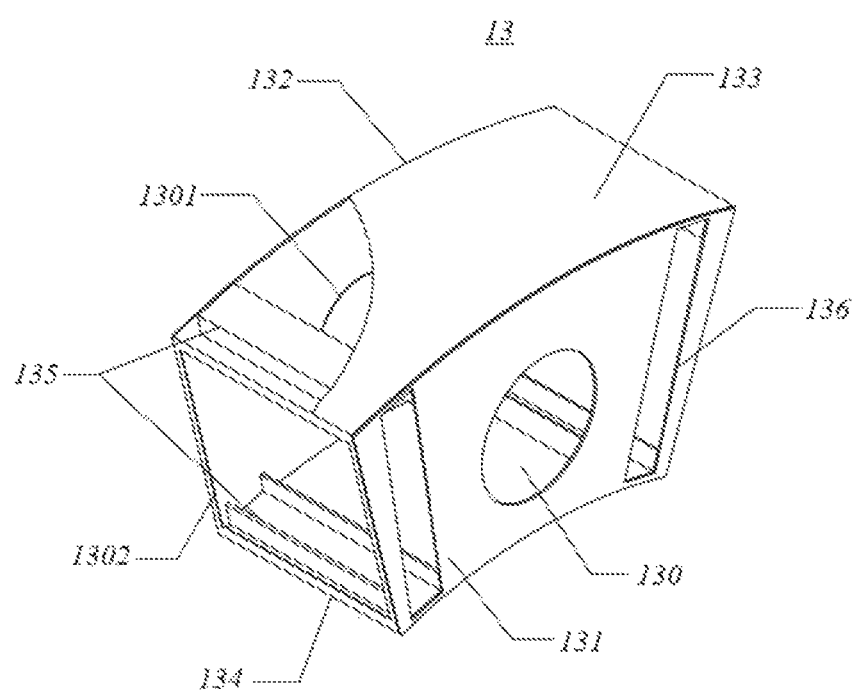
FIG. 2 is a schematic view of a structure of a housing in the cooling device shown in FIG. 1.
Figure 3:
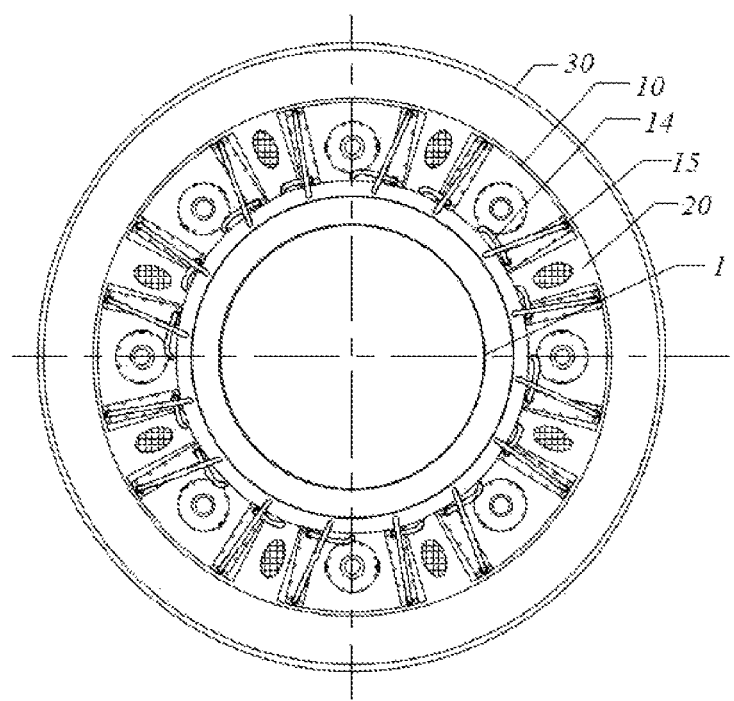
FIG. 3 is a schematic view of an overall layout structure of a motor provided by an embodiment of the present application.

With reference to FIG. 2, the housing 13 includes a first plate 131 and a second plate 132, which are provided opposite to each other along the axial direction of the motor, the air inlet 1301 is provided on the second plate 132, and an end of the circulation fan 12 along its own axial direction projects beyond the first plate 131.

The housing 13 further includes a third plate 133 and a fourth plate 134, which are connected to the first plate 131 and the second plate 132 and provided opposite to each other, and an air outlet 1302 is formed by the first plate 131, the second plate 132, the third plate 133, and the fourth plate 134 at at least one circumferential end of the motor. For example, the air outlet 1302 may be formed at two circumferential ends of the motor.

Optionally, the third plate 133 and the fourth plate 134 are provided with installation grooves 135 at the two circumferential ends of the motor, the two heat exchangers 11 are detachably installed in the installation grooves 135 of the third plate 133 and the fourth plate 134, and the circulation fan 12 is provided between the two heat exchangers 11, thereby increasing the heat exchange area.

In addition, the first plate 131 is provided with an inspection opening 136 allowing the heat exchanger to pass through, and the first plate 131 covers the inspection opening 136 via a cover plate 16. For example, a sealing ring or the like is provided between the cover plate 16 and the inspection opening 136.

A first joint 111 and a second joint 112 are provided on the heat exchanger 11, the cover plate 16 is provided with a first opening 161 and a second opening 162, the first joint 111 projects beyond the first opening 161 and is connected to the liquid supply pipe 14, and the second joint 112 projects beyond the second opening 162 and is connected to the liquid/air return pipe 15.

Therefore, when the heat exchanger 11 needs to be replaced or repaired, it is only necessary to remove the cover plate 16 and pull the heat exchanger 11 along an extension direction of the installation groove 135, and thus the replacement work can be quickly completed at the inspection opening 136 without removing other components, thereby improving the maintainability of the cooling device 10.

With reference to FIGS. 3 to 6, an embodiment of the present application also provides a motor, the motor includes a stator support 20 and a rotor support 30, which are connected in dynamic sealed manner to form ventilation chambers 31 at two axial ends of the motor, and the motor further includes a confluence chamber 201 and at least one cooling device 10 of any one type as described above.

The motor can be a structure having an outer rotor and an inner stator or a structure having an outer stator and an inner rotor. The stator is fixed on a fixed shaft by the stator support 20, the rotor is fixed on the moving shaft by the rotor support 30, and the fixed shaft and the moving shaft are connected by a bearing to realize relative rotation. The fixed shaft and the moving shaft together constitute a main shaft 1 of the motor. For ease of description, the description is made in the embodiments of the present application by taking a motor of a structure having the outer rotor and the inner stator as an example.

The stator includes a stator winding 1a and a plurality of stator cores 1b provided at intervals along the axial direction, and a radial channel 1d is formed between every two adjacent stator cores 1b. Each of the stator cores 1b includes a yoke part and a tooth part (not shown in the figure) which is integrally formed with the yoke part, the stator winding 1a is wound around the tooth part, and the stator is fixed to the stator support 20 by the yoke part. The rotor support 30A is provided with a magnetic steel 3a thereon, and an air gap 1c is formed between the rotor and the stator along the radial direction. The stator winding 1a, the stator cores 1b, and the magnetic steel 3a are all heat dissipating components.

The confluence chamber 201 is provided along the circumferential direction of the stator support 20, at least one cooling device 10 is provided along the circumferential direction of the stator support 20, and the cooling device 10 is located on a radial inner side of the confluence chamber 201 and in communication with the confluence chamber 201 through the air inlet 1301.

Figure 4:
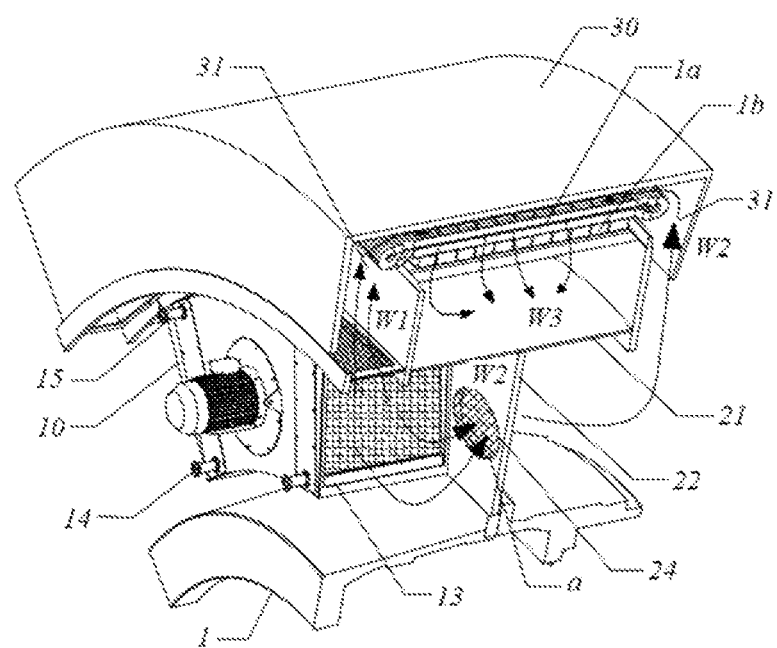
FIG. 4 is a perspective view of a partial structure of the motor shown in FIG. 1.
Figure 5:
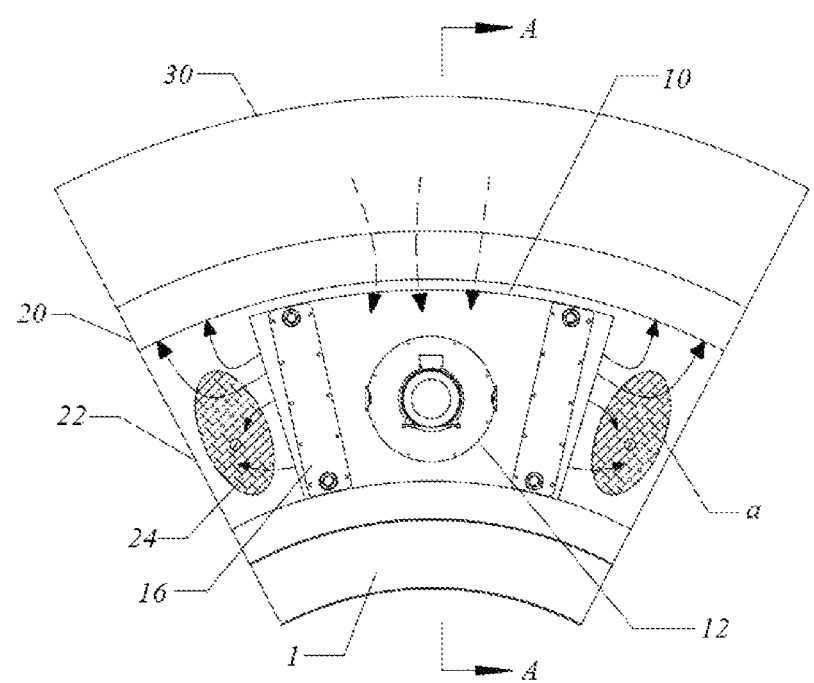
FIG. 5 is a schematic view of a partial structure of the motor shown in FIG. 4 along an axial direction.
Figure 6:
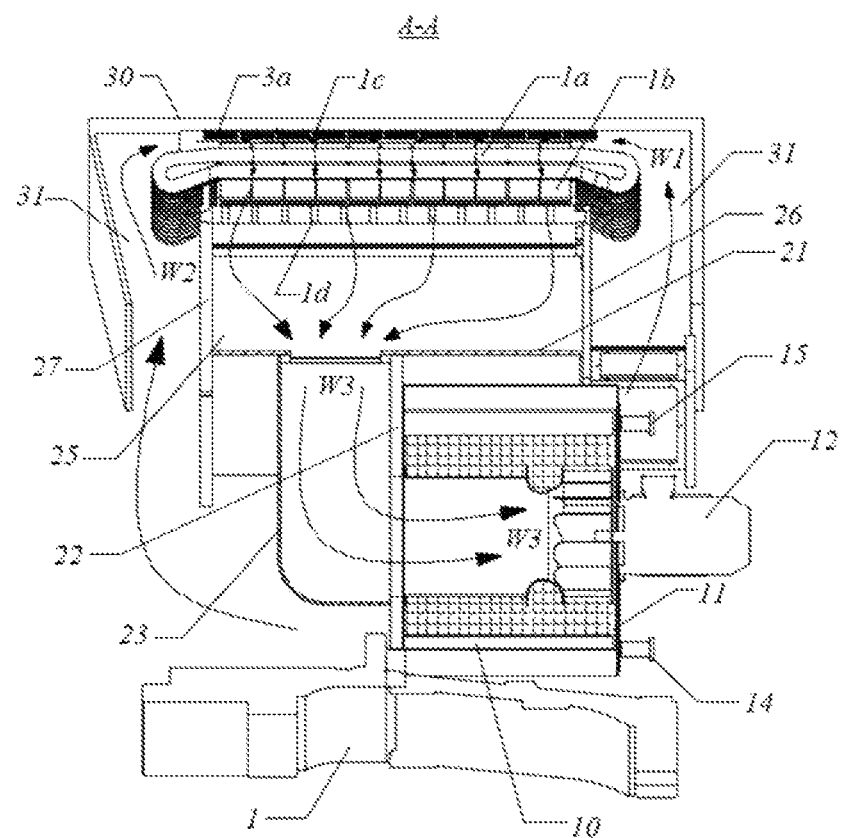
FIG. 6 is a cross-sectional view taken along a direction A-A in FIG. 5.

Thus, the cooling process of the cooling device 10 provided by the embodiments of the present application is as follows: under the action of the circulation fan 12 in the cooling device 10, the cooling air is introduced from the interior of the motor through the ventilation pipe 23 into the housing 13 of the cooling device 10 such that the heated cooling air exchanges heat with the heat exchanger 11, as shown by the arrow W3 in FIG. 2, the heat exchanger 11 is connected to the external cooling system through the liquid supply pipe 14 and the liquid/air return pipe 15 such that the temperature of the cooling air drops to form an airflow with relatively low temperature, and under the negative pressure of the circulating fan 12, a part of the cooling air directly enters the adjacent ventilation chamber 31 at one end, as shown by the arrow W1 in FIG. 4, to cool one end of the stator winding 1a and then flows along the air gap 1c to realize the cooling of a part of the magnetic steel 3a, the rotor yoke, and the stator winding 1a; and the other part of the cooling air enters the ventilation chamber 31 at the other end of the motor through a ventilation hole a on a separation plate 22, as shown by the arrow W2 in FIG. 2, to cool the other end of the stator winding 1a and then flows along the air gap 1c to realize the cooling of the other part of the magnetic steel 3a, the rotor yoke, and the stator winding 1a.

The two parts of cooling air entering into the air gap 1c pass through the plurality of radial channels 1d distributed at intervals along the axial direction of the stator to realize the cooling of the stator winding 1a and the stator yoke, the temperature of the cooling air passing through the radial ventilation channels 1d rises, the high-temperature cooling air enters the cooling device 10 again through the confluence chamber 25 and the ventilation pipe 23 under the action of the circulation fan 12, and a next cooling cycle of the airflow organization performs under the action of the circulation fan 12.

In addition, the liquid supply pipe 14 and the liquid/air return pipe 15 of the heat exchanger 11 are located outside the housing 13 of the cooling device 10, which further simplifies the internal structure of the motor, thereby causing the motor to have a simpler and more compact overall structure and to occupy a smaller space.

By providing the confluence chamber 25 and at least one cooling device 10 in communication with the confluence chamber 25 along the circumferential direction of the stator support 20, the motor provided by the embodiments of the present application can cool the heating components inside the motor in circulation, and has simple and compact overall structure and occupies a small space.

The specific structure of the cooling device 10 will be described in further detail below with reference to the accompanying drawings.

With reference to FIG. 3 again, in some embodiments, the circulation fans 12 of two or more cooling devices 10 are provided along the axial direction of the motor to guide the airflow from the heat exchanger 11 to one of the ventilation chambers 31 and to guide the airflow to the other ventilation chamber 31 through the ventilation hole a. Through the organic combination of the cooling device 10 and the stator support 20, the volume of the circulation fan 12 can be reduced, and compared with a case, in which an integrated circulation fan provided along the axial direction of the stator support 20, the same heat dissipation effect can be achieved, and also the motor has simple and compact overall structure and occupies a small space.

Further, optionally, the two or more cooling devices 10 are uniformly distributed along the circumferential direction of the stator support 20. Since the ventilation chambers 31 at the two axial ends of the motor have a volume large enough, they can play a role of a static pressure cavity, so the end of the stator winding 1a has a uniform cooling effect and also the uniformity of the airflow entering the air gap 1c along the axial direction is ensured, the cooling air entering the air gap 1c flows along the air gap 1c and also through the stator winding 1a and the radial ventilation channel 1d of the stator core 1b into the confluence chamber 25, and the confluence chamber 25 also has a volume large enough and can play a role of a static pressure cavity, thereby ensuring the uniformity of the airflow in the entire circumferential space, avoiding non-uniform airflow organization, and improving the heat dissipation uniformity of the cooling system.

With reference to FIG. 6 again, the stator support 10 includes a first end plate 26 and a second end plate 27, which extends along the radial direction and is provided opposite to each other along the axial direction, and an annular plate, which is provided between the first end plate 26 and the second end plate 27, and the first end plate 26, the second end plate 27, and the annular plate 21 form a confluence chamber 201.

Further, the stator support 10 further includes a separation plate 22, which is connected to the annular plate 21 and extends inwardly along the radial direction, at least one ventilation pipe 23 is further provided between the annular plate 21 and the separation plate 22, and the cooling device 10 is provided on the separation plate 22 and in communication with the ventilation pipe 23 through the air inlet 1301.

Optionally, the ventilation pipe 23 has an inner wall and an outer wall provided for thermally insulating, so that the cooling air inside the ventilation pipe 23 does not exchange heat with the airflow outside of the ventilation pipe 23 before reaching the housing 13 of the cooling device 10, and a cavity for effectively sealing the airflow organization is formed among the annular plate 21, the stator support 20, the cooling device 10, and the main shaft 1, thereby preventing the cooling air entering the housing 13 through the ventilation pipe 23 from being short-circuited during the heat exchange with the heat exchanger 11.

Further, at least one ventilation hole a is provided on the separation plate 22, the two or more cooling devices 10 are provided on the separation plate 22 at intervals along the circumferential direction of the stator support 20, and an isolation chamber is formed between every two adjacent cooling devices 10 (not shown in the figure) and in communication with the ventilation hole a. That is, on the radial inner side of the annular plate 21, the isolation chambers and the housings 13 are alternately disposed along the circumferential direction of the stator support 10.

Since the confluence chamber 25 is in communication with the airflow organization of the heat exchanger 11 in each cooling device 10 through at least one ventilation pipe 23, and each isolation chamber is in communication with the ventilation chambers 31 at the two axial ends of the motor through the ventilation hole a provided on the separation plate 22, so after any one of the circulation fans 12 fails, the other circulation fans 12 can still allow the airflow, which is present at the heat exchanger 11 corresponding to the failed circulation fan 12, to pass through, the heat dissipation requirements of the stator winding 1a, the stator core 1b, and the magnetic steel 3a corresponding to the failed circulation fan 12 can be taken into account, and the reliability and fault tolerance of the motor are improved.

In addition, for working conditions with heavy wind and sand or harsh working environment, in order to avoid insufficient heat dissipation or damage and failure of the components of the motor due to dust accumulation, optionally, a filter 24 is provided at the ventilation hole a of the separation plate 22.

Thus, in one aspect, the housing 13 of the cooling device 10 can be used as a reinforcing rib of the stator support 20, thereby improving the structural strength and rigidity of the stator support 20; in the second aspect, the cooling device 10 is provided on a side of the separation plate 22 as a modular structure and in communication with the external environment, and can be removed directly when the cooling device 10 needs to be replaced or repaired; and if only the heat exchanger 11 needs to be replaced, the cooling device 10 do not have to be removed and only the cover plate 16 on the cooling device 10 needs to be removed, thereby the heat exchanger 11 can be quickly replaced at the inspection opening 136 without removing other components, thereby improving the maintainability of the motor.

It should be noted that although for easy of description, the description is made by taking the motor of a structure having the outer rotor and the inner stator structure as an example, it should be understood that, according to the exemplary embodiments of the present application, the working principle of the cooling device 10 described above is also applicable to the motor of a structure having the outer stator and the inner rotor, and the corresponding stator support 20 and rotor support 30 can be modified adaptively.

In addition, an embodiment of the present application also provides a wind turbine set, which includes a nacelle and a motor as described above, and the circulation fan 12 of the cooling device 10 of the motor is provided on a side of the nacelle, which is convenient for later installation, maintenance, and replacement.

The wind turbine set provided by the embodiments of the present application adopt the motor described above, which can effectively reduce the size of the nacelle, thereby further reducing the whole machine cost and load and improving the reliability and maintainability of the wind turbine set.

Moreover, the motor according to the exemplary embodiments described above can be applied to various apparatus that needs to be provided with a motor, for example, but not limited to, a wind turbine set.

Those skilled in the art should understand that the embodiments described above are all illustrative and unrestrictive. Different technical features appearing in different embodiments can be combined to achieve beneficial effects. Those skilled in the art should be able to understand and realize other modified embodiments of the disclosed embodiments on the basis of studying the drawings, the description, and the claims. In the claims, the term "include" does not exclude other device or step; when an article is not modified by a quantitative word, it is intended to include one/one kind of or more/more kinds of articles, and can be used interchangeably with "one/one kind of or more/more kinds of articles"; and the terms "first" and "second" are used to indicate names rather than to indicate any specific order. Any reference number in the claims should not be understood as limiting the scope of protection. The functions of multiple parts appearing in the claims can be realized by a single hardware or software module. The appearance of certain technical features in different dependent claims does not mean that these technical features cannot be combined to achieve beneficial effects.

What is claimed is:

1. A cooling device, which is integrated inside a motor, wherein the cooling device comprises
    a housing extending along an axial direction of the motor, wherein the housing comprises a receiving cavity and an air inlet and an air outlet in communication with the receiving cavity, and the housing is in communication with an interior of the motor through the air inlet and in communication with ventilation chambers at two axial ends of the motor through the air outlet;
    a heat exchanger located in the receiving cavity and provided close to the air outlet; and
    a circulation fan provided in the receiving cavity along the axial direction of the motor, wherein the housing comprises a first plate and a second plate provided opposite to each other along the axial direction of the motor, the air inlet is provided on the second plate, and an end of the circulation fan along its own axial direction projects beyond the first plate.

2. The cooling device according to claim 1, wherein the housing further comprises a third plate and a fourth plate, which are connected to the first plate and the second plate and provided opposite to each other, and the air outlet is formed by the first plate, the second plate, the third plate, and the fourth plate at at least one circumferential end of the motor.

3. The cooling device according to claim 2, wherein the third plate and the fourth plate are provided with installation grooves at two circumferential ends of the motor, two heat exchangers are detachably installed in the installation grooves of the third plate and the fourth plate, and the circulation fan is provided between the two heat exchangers.

4. The cooling device according to claim 1, wherein an inspection opening, which allows the heat exchanger to pass through, is provided on the first plate, and the first plate covers the inspection opening via a cover plate.

5. A motor, comprising a stator support and a rotor support, which are connected in a dynamic sealed manner to form ventilation chambers provided at two axial ends of the motor, wherein the motor further comprises
    a confluence chamber provided along a circumferential direction of the stator support; and two or more cooling devices according to claim 1, which are distributed at intervals along the circumferential direction of the stator support, wherein the cooling devices are located on a radial inner side of the confluence chamber, in communication with the confluence chamber through the air inlet of the housing, and in communication with the ventilation chambers through the air outlet of the housing.

6. The motor according to claim 5, wherein the stator support comprises a first end plate and a second end plate, which extends along a radial direction and disposed opposite to each other along an axial direction, and an annular plate, which is disposed between the first end plate and the second end plate, and the confluence chamber is formed by the first end plate, the second end plate, and the annular plate.

7. The motor according to claim 6, wherein the stator support further comprises a separation plate connected to the annular plate and extending inwardly along the radial direction, at least one ventilation pipe is further provided between the annular plate and the separation plate, and the cooling device is provided on the separation plate and in communication with the ventilation pipe through the air inlet.

8. The motor according to claim 5, wherein the separation plate is provided with at least one ventilation hole, the two or more cooling devices are provided on the separation plate at intervals along the circumferential direction of the stator support, and an isolation chamber is formed between every two adjacent cooling devices and in communication with the ventilation hole.

9. The motor according to claim 8, wherein a filter is provided at the ventilation hole of the separation plate.

10. The motor according to claim 7, wherein the ventilation pipe has an inner wall and an outer wall provided for thermally insulating.

11. A wind turbine set, comprising:
a nacelle; and
the motor according to claim 5, wherein a circulation fan of a cooling device of the motor is provided at one side of the nacelle.

* * * * *